No. 891,272. PATENTED JUNE 23, 1908.
C. C. LOEWE.
ROUTE GUIDE MAP.
APPLICATION FILED OCT. 12, 1906.

Witnesses:

Inventor:
Dr. Cornelius Carl Loewe

UNITED STATES PATENT OFFICE.

CORNELIUS CARL LOEWE, OF BERLIN, GERMANY.

ROUTE-GUIDE MAP.

No. 891,272.  Specification of Letters Patent.  Patented June 23, 1908.

Application filed October 12, 1906. Serial No. 338,634.

*To all whom it may concern:*

Be it known that I, CORNELIUS CARL LOEWE, a subject of the King of Prussia, residing at Berlin, W., in Germany, have invented certain new and useful Improvements in Route-Guide Maps, of which the following is a specification.

This invention relates to improvements in route guides or cartographic guides relating to roads and water courses.

Ordinary maps do not answer the requirements of modern high-speed traffic, more particularly as regards automobile traffic. They are for this purpose too complex, containing much that is useless and misleading to the driver of a motor-car. However large the scale of such maps may be, the parts representing roads are not of sufficient width to allow of indicating thereon those particulars which are at each moment of travel of special importance to the driver, as for example the radii of curves, bridges, railway crossings and other obstacles, slopes, ditches, nature of the road, and so on. If the scale were enlarged to allow of entering even a few of these particulars, a map several yards in length would be required to represent the country traversed in a single day.

The purpose of the present invention is, in the first place, to represent the roads or routes themselves in a striking manner, by means of comparatively wide strips of the map surface on which the particulars of primary importance to the driver, are distinctly indicated, in part pictorially and in part graphically by means of numerals, letters or other symbols. All other features such as the names of towns, villages and adjacent railway stations, and features of the landscape, such as woods, fields, streams, and the like, are indicated in the proper cartographic manner, but are set back or removed to the sides of the map, so that they do not attract involuntary attention on the part of a person who glances at the central strip of the map. The borders of the route are either represented with strict cartographic accuracy, all the curves of the road being duly indicated, or they may be indicated by more or less straight lines, in view of the fact that at most times the road appears practically straight to a person traveling thereon.

Figure 1:
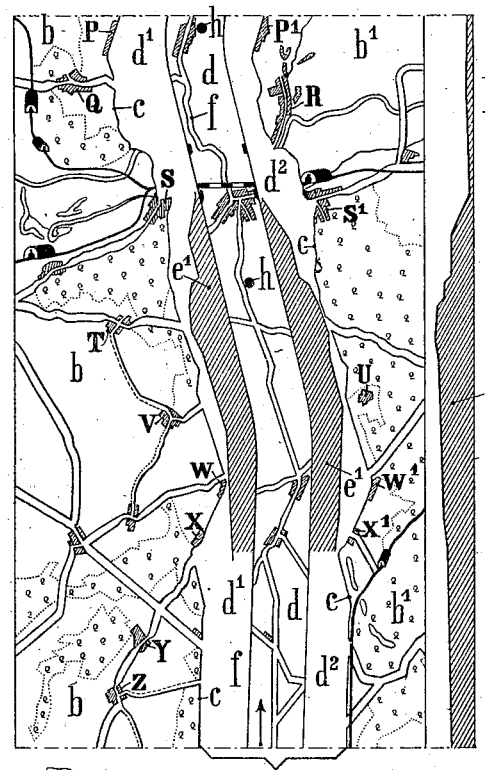
Figure 2:
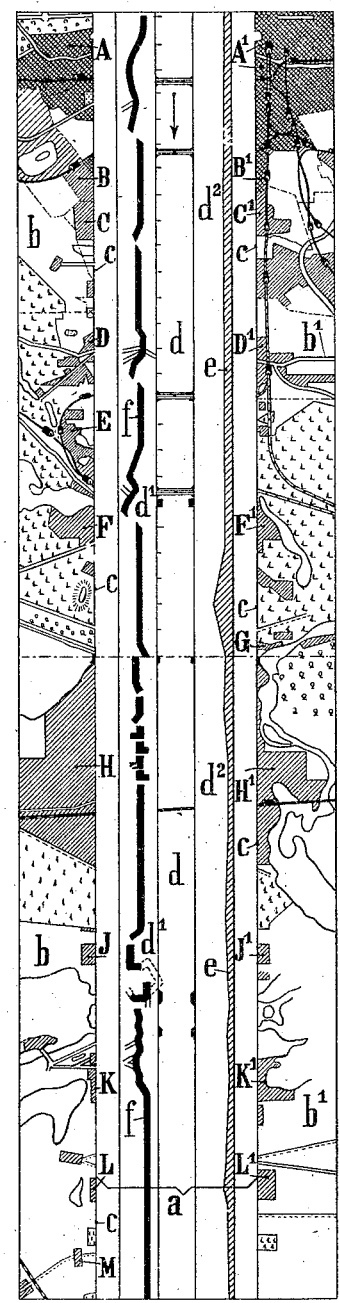
Figure 3:
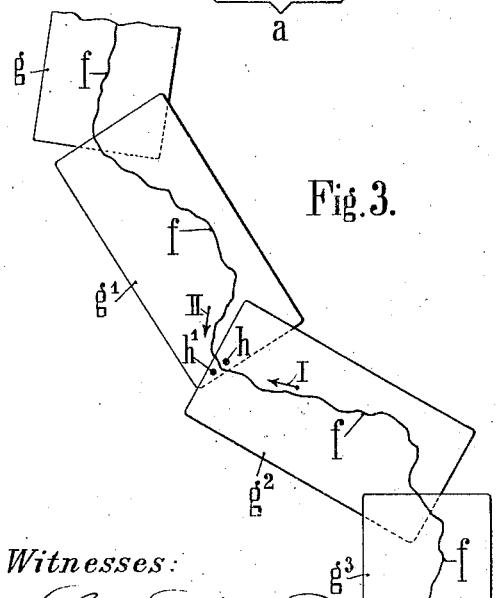

The invention is illustrated by means of examples in the annexed drawings in which Figures 1 and 2 illustrate two methods of putting the same into practice; Fig. 3 illustrates the method of constructing a road map in separate sections so that in each section the road is shown approximately at the center of the map.

As shown in Figs. 1 and 2, a comparatively wide space $a$ bordered by lines $c$ is provided at the center of the map. The border lines $c$ may either represent, with cartographic accuracy, the borders of the country adjacent the route, indicating all the curves, gaps and the like, as shown in Fig. 1, or they may be continuous and straight, as shown in Fig. 2; in the latter case the space $a$ constitutes a straight central strip of the map surface. In either case the space $a$ is divided into a plurality of parallel, or substantially parallel, parts $d$, $d^1$ and $d^2$, and the part at the center represents the road. All particulars requiring the attention of a driver or traveler on the route are indicated in the said central part, either by cartographic reproduction of the route as in Fig. 1, or by words printed in full or by single letters, numerals or other symbols. Particulars thus indicated attract immediate attention, or are perceptible at a glance, owing to the fact that the part $d$ is divided by an intervening space or spaces ($d^1$, $d^2$) from the lateral parts $b$ $b^1$ representing the adjacent country. Certain particulars may, however, be indicated in the said intervening spaces, as for example the mileage and the like, or the sectional contour of the road, the latter being indicated by colored or cross-hatched parts $e^1$ (Figs. 1 or 2), at one or both sides of the road. The contour of the road can, however, also be illustrated by a part $e$ (Fig. 1) in the margin of the map, at one side or both sides of the latter, instead of in the spaces $d^1$ and $d^2$, or in addition to illustration in the latter. If the border lines $c$ are cartographically accurate and indicate the curves of a road, as shown in Fig. 1, it is preferable that only hills of particular importance should be indicated by parts $e^1$ in the spaces $d^1$ $d^2$. If the lines $c$ are straight, as shown in Fig. 2, the contour of an entire road may be illustrated by cross-hatched part $e$ in the space $d^2$, and an additional plan view of the road, on a smaller scale but indicating all curves, crossings and the like, may be given in the space $d^1$. If, as in the case illustrated, the frequency and nature of the bends are such that a continuous plan view cannot be given in the comparatively small width of space $d^1$ available, the road is divided into sections, according to the number, angle and length of the bends, and the said sections are arranged end to end in the space $d^1$. An accurate plan view of the road would then be obtained if the ends of these sections were fitted together.

The route is always shown in such a way that it extends from the top to the bottom of the sheet, without regard to the actual bearings thereof on the ordinary map, and the names of localities are so printed that they are in line with the top and bottom edges of the sheet.

In view of the fact that in many cases the direction of the route as a whole varies considerably, although the section traversed at any given moment appears to the driver as a practically straight line, it is difficult to represent the entire road on a single sheet without making the latter of unwieldy size. The map is, therefore, preferably made in sections, as shown in Fig. 3, each of the sheets $g$, $g^1$, $g^2$, $g^3$ having at one end a small space adapted to be overlapped by the sheet representing the adjacent route section. Near the upper or lower edge of each sheet a compass or the like may be graphically represented in such a manner as to indicate the bearings of the road. It will be noted that the method here indicated is by no means identical with the known method of dividing a map into sections by cutting it into a plurality of more or less equal parts. With the improved route map this known method is impracticable, since if the latter were adopted the names of the localities would not be in line with the lower edges of the respective sheets, nor would the route in all cases occupy a central strip of the sheet.

Various ways may be adopted for arranging the composite map for convenient use. The entire route may be shown on a single strip on which the sectional maps are divided from each other by spaces containing references, directions or the like, or the sheets may be arranged side by side to form a foldable strip. The map may also be produced in book form, each section forming a leaf and the continuation of the preceding one. Warnings may be printed at the ends of sections, as at $h$ $h^1$ (Fig. 3), if an obstacle or other feature requiring particular attention on the part of the driver is indicated at or near the beginning of the next section. The dot $h$, for example, on sheet $g^2$, indicates a dangerous place on the next section in the direction of the arrow I; the dot $h^1$ on sheet $g^1$ indicates a dangerous place on the next section in the direction of the arrow II. If the danger is due to the presence of a hill, the percentage of rise or fall may be indicated in the space $c$, and may also be entered numerically in the cross-hatched profile view. The arrangement of the sheets may also be such that a sheet with printed text is placed opposite each map section, containing particulars of the routes and places included in the respective section.

Preferably a section of an ordinary map is given with each of the route sections, showing the adjacent country to a greater or less extent. The map of the adjacent country may be in the form of a single strip, or may be sub-divided, or may be on the same sheet as the route section. In the drawing the parts marked with capital letters represent features of the adjacent country. To allow of readily selecting the map sections of adjacent country belonging to the route sections in use, the respective sheets are uniformly numbered and marked at their margins.

What I claim as my invention and desire to secure by Letters Patent of the United States is:—

1. A map comprising two cartographic reproductions of the country lying on the one side and on the other side respectively of a selected route, and an intervening strip representative of said route on an exaggerated transverse scale, said strip comprising graphical selected particulars descriptive of the route.

2. A map comprising two cartographic reproductions of the country lying on the one side and on the other side respectively of a selected route, and an intervening strip representative of said route on an exaggerated transverse scale, said strip comprising three parallel divisions containing respectively graphical selected particulars descriptive of said route.

3. A map comprising two cartographic reproductions of the country lying on the one side and on the other side respectively of a selected route, and an intervening strip representative of said route on an exaggerated transverse scale, said strip comprising three parallel divisions of which the central division is a cartographic reproduction of the route and the two lateral divisions contain graphical selected particulars descriptive of said route.

In testimony whereof I have signed my name to this specification in the presence of two subscribing witnesses.

CORNELIUS CARL LOEWE.

Witnesses:
 LEO GIESM,
 WEVDT VON ROSENBERG-GRUSZCZYNSKI.